United States Patent
Wang et al.

(10) Patent No.: US 12,106,465 B2
(45) Date of Patent: Oct. 1, 2024

(54) IMAGE ANNOTATION METHOD, DEVICE AND SYSTEM

(71) Applicant: BOE TECHNOLOGY GROUP CO., LTD., Beijing (CN)

(72) Inventors: Yaoping Wang, Beijing (CN); Meijuan Zhang, Beijing (CN); Yongzhang Liu, Beijing (CN); Zhaoyue Li, Beijing (CN); Dong Chai, Beijing (CN); Hong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 439 days.

(21) Appl. No.: 17/628,364

(22) PCT Filed: Mar. 26, 2021

(86) PCT No.: PCT/CN2021/083332
§ 371 (c)(1),
(2) Date: Jan. 19, 2022

(87) PCT Pub. No.: WO2021/197231
PCT Pub. Date: Oct. 7, 2021

(65) Prior Publication Data
US 2022/0414859 A1    Dec. 29, 2022

(30) Foreign Application Priority Data

Mar. 31, 2020   (CN) .......................... 202010247686.X

(51) Int. Cl.
*G06T 7/00* (2017.01)
*G06T 7/262* (2017.01)

(52) U.S. Cl.
CPC ............ *G06T 7/0004* (2013.01); *G06T 7/262* (2017.01); *G06T 2207/20081* (2013.01); *G06T 2207/20084* (2013.01); *G06T 2207/30204* (2013.01)

(58) Field of Classification Search
CPC .................. G06T 7/0004; G06T 7/262; G06T 2207/20081; G06T 2207/20084;
(Continued)

(56) References Cited

U.S. PATENT DOCUMENTS 11,250,552 B1 * 2/2022 Padfield .............. G06F 18/2155
2020/0394784 A1 * 12/2020 Toth ...................... G06T 7/0004
(Continued)

*Primary Examiner* — Roy M Punnoose
(74) *Attorney, Agent, or Firm* — WHDA, LLP

(57) ABSTRACT

An image marking method, apparatus and system, which relates to the technical field of image processing. The present disclosure includes, when the working mode of the first client is a first mode, receiving a first marking task assigned by a second client, on the condition that the image marking approach is the first marking approach, according to a neural network model, determining a first marking result corresponding to the first original image; on the condition that the image marking approach is the second marking approach, according to an unsupervised algorithm model, determining a second marking result corresponding to the first original image; on the condition that the image marking approach is the third marking approach, receiving a third marking result inputted by a user into the first original image; and sending a target marking result to the second client.

20 Claims, 7 Drawing Sheets

(58) Field of Classification Search
CPC . G06T 2207/30204; G06T 2207/20056; G06T 7/0008; G06T 7/001; G06F 16/51; G06F 16/55; G06F 16/58; G06F 16/5866; G06N 3/04; G06N 3/08; G06N 3/045

See application file for complete search history.

(56) References Cited

U.S. PATENT DOCUMENTS

2022/0245801 A1* 8/2022 Gietzen ................ G06V 10/774
2023/0343078 A1* 10/2023 Dey ........................ G06T 7/11

\* cited by examiner

IMAGE ANNOTATION METHOD, DEVICE AND SYSTEM

CROSS REFERENCE TO RELEVANT APPLICATIONS

The present application claims the priority of the Chinese patent application filed on Mar. 31, 2020 before the Chinese Patent Office with the application number of 202010247686.X and the title of "IMAGE ANNOTATION METHOD, DEVICE AND SYSTEM", which is incorporated herein in its entirety by reference.

TECHNICAL FIELD

The present disclosure relates to the technical field of image processing, and particularly relates to an image marking method, apparatus and system.

BACKGROUND

In the field of display products manufacturing, because of factors such as the errors in the equipment, the parameters and the operation and ambient interference, which may make the products imperfect. In the process of the product manufacturing, after each stage of the process, the product is detected by using an image acquiring device, for example, detecting the product by using an Automated Optical Inspection (AOI) device.

Currently, the image acquiring device sends the detected imperfect images into a client, and the marking personnel are required to, in the client, perform manual marking to the defects of each of the imperfect images, to obtain the marking results of the imperfect images.

SUMMARY

The present disclosure provides an image marking method, apparatus and system.

The present disclosure provides an image marking method, wherein the method is applied to a first client, and the method comprises:
  determining a working mode of the first client;
  on the condition that the working mode is a first mode, receiving a first marking task assigned by a second client, wherein the first marking task comprises performing defect marking to a first original image, and an image marking approach for performing the defect marking to the first original image comprises a first marking approach, a second marking approach and a third marking approach;
  on the condition that the image marking approach is the first marking approach, according to a neural network model, determining a first marking result corresponding to the first original image;
  on the condition that the image marking approach is the second marking approach, according to an unsupervised algorithm model, determining a second marking result corresponding to the first original image;
  on the condition that the image marking approach is the third marking approach, receiving a third marking result inputted by a user into the first original image; and
  sending a target marking result to the second client, wherein the target marking result comprises any one of the first marking result, the second marking result and the third marking result.

The present disclosure further discloses an image marking apparatus, wherein the apparatus is applied to a first client, and the apparatus comprises:
  a working-mode determining module configured for determining a working mode of the first client;
  a first-marking-task receiving module configured for, on the condition that the working mode is a first mode, receiving a first marking task assigned by a second client, wherein the first marking task comprises performing defect marking to a first original image, and an image marking approach for performing the defect marking to the first original image comprises a first marking approach, a second marking approach and a third marking approach;
  a first-marking-result determining module configured for, on the condition that the image marking approach is the first marking approach, according to a neural network model, determining a first marking result corresponding to the first original image;
  a second-marking-result determining module configured for, on the condition that the image marking approach is the second marking approach, according to an unsupervised algorithm model, determining a second marking result corresponding to the first original image;
  a third-marking-result determining module configured for, on the condition that the image marking approach is the third marking approach, receiving a third marking result inputted by a user into the first original image; and
  a target-marking-result sending module configured for sending a target marking result to the second client, wherein the target marking result comprises any one of the first marking result, the second marking result and the third marking result.

The present disclosure further discloses an image marking system, wherein the system comprises a first client and a server:
  the first client comprises the image marking apparatus stated above; and
  the server is configured for receiving the target marking result sent by the first client or the second client, and storing the target marking result at a designated position.

The present disclosure further discloses an electronic device, wherein the electronic device comprises a first client, the electronic device comprises a processor, a memory and a computer program that is stored in the memory and is executable in the processor, and the computer program, when executed by the processor, implements the steps of the image marking method stated above.

The present disclosure further discloses a computer-readable storage medium, wherein the computer-readable storage medium stores a computer program, and the computer program, when executed by a processor, implements the steps of the image marking method stated above.

The present disclosure further provides a computer program, wherein the computer program comprises a computer-readable code, and when the computer-readable code is executed in an electronic device, the computer-readable code causes the electronic device to implement the image marking method stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art may obtain other figures according to these figures without paying creative work.

DETAILED DESCRIPTION OF THE EMBODIMENTS

In order to make the above purposes, features and advantages of the present disclosure more apparent and understandable, the present disclosure will be described in further detail below with reference to the drawings and the particular embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
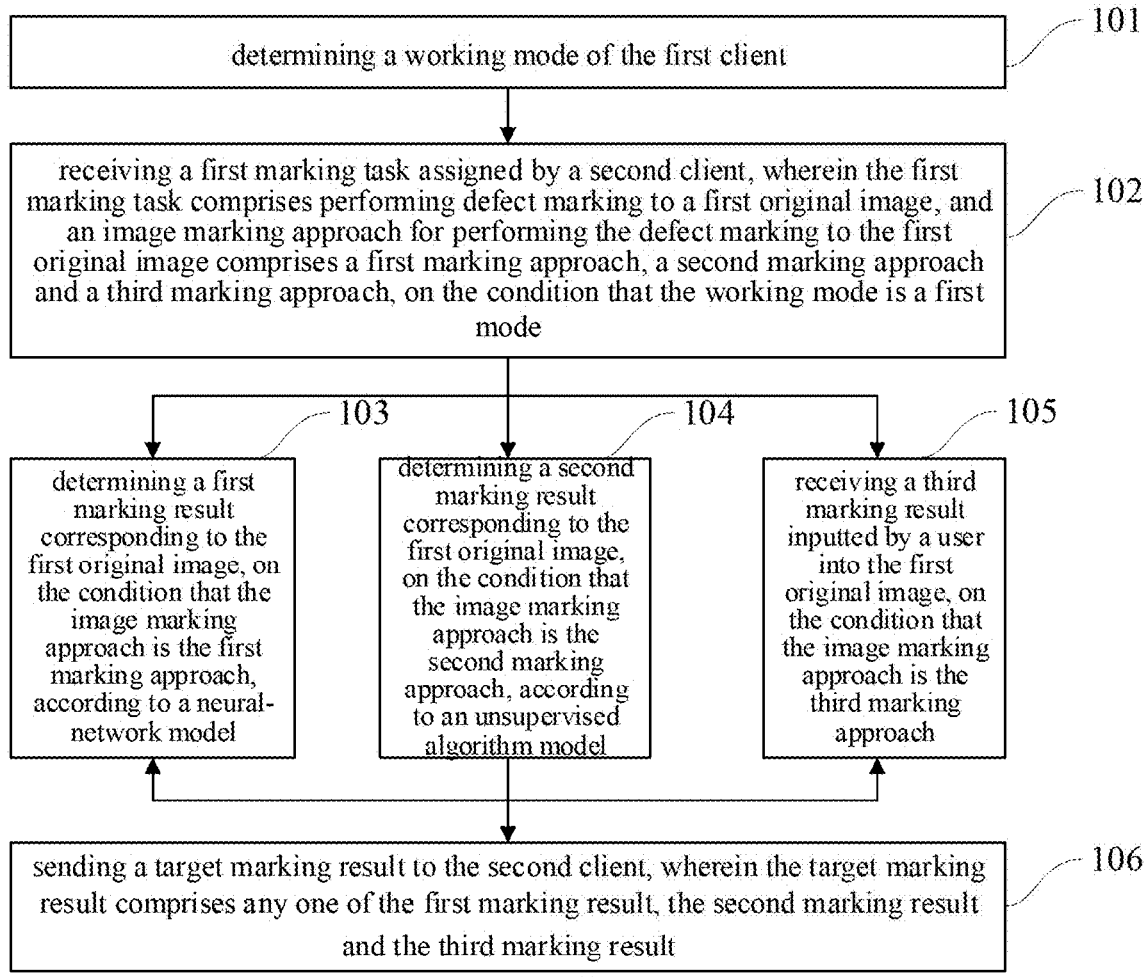
FIG. 1 shows a flow chart of the image marking method according to an embodiment of the present disclosure.

Referring to FIG. 1, which shows a flow chart of the image marking method according to an embodiment of the present disclosure, wherein the method is applied to a first client, and may particularly comprise the following steps:

Step 101: determining a working mode of the first client.

In an embodiment of the present disclosure, the first client is an image marking client, and it mainly has two working modes, i.e., a first mode and a second mode.

When the working mode of the first client is the first mode, the first client is mainly configured for receiving a first marking task assigned by a second client, and performing defect marking to the first original image according to the first marking task. When the working mode of the first client is the second mode, the first client is mainly configured for assigning a second marking task to a third client, and receiving an examination result of the examination by the user on the target marking result returned by the third client.

It should be noted that the first client according to the embodiments of the present disclosure integrates the two working modes, and, according to the information of the logging-in by the user onto the first client such as the user name and the password, determines the working mode of the first client.

For example, the user logs in onto the first client by using information such as the user name and the password. The first client determines, according to the logging-in information, whether the user has the administrator right. If he has the administrator right, then the first client sets the working mode of the first client to be the second mode. If he does not have the administrator right, then the working mode of the first client cannot be set to be the second mode. In this case, the working mode of the first client is set to be the first mode directly by default. Alternatively, the first client sets the working mode of the first client according to the information of the logging-in by the user onto the first client such as the user name and the password. If the logging-in information onto the first client is an administrator information, the first client sets the working mode of the first client to be the second mode. If the logging-in information onto the first client is a marking-personal information, the first client sets the working mode of the first client to be the first mode.

Step 102: on the condition that the working mode is a first mode, receiving a first marking task assigned by a second client, wherein the first marking task comprises performing defect marking to a first original image, and an image marking approach for performing the defect marking to the first original image comprises a first marking approach, a second marking approach and a third marking approach.

In an embodiment of the present disclosure, in the process of the product manufacturing, after each stage of the process, the product is detected by using an image acquiring device. The image acquiring device may be a camera, an AOI device and so on. The AOI device may perform optical checking on the product in the fabrication process, determine the difference between the product image and the image of a standard product, thus identify the product as defected, and photograph the product, thereby obtaining an imperfect image containing a graphic of the product defect, which facilitates the subsequent identification and analysis on the defect category.

The image acquiring device sends the detected imperfect image to a server. The server receives the imperfect image sent by the image acquiring device, and saves the imperfect image into a product-image database. The product-image database may be a Distributed File System (DFS) or another data storage device.

When it is determined that the working mode of the first client is the first mode, a second client is required to assign a first marking task to the first client. The second client is required to connect to the server, and, according to the characteristic of the distribution of the patterns in the imperfect image in the product-image database in the server, determine the image marking approach corresponding to the first original image that the first client is required to perform the defect marking to. Subsequently, the second client assigns the first marking task to the first client (at this point, the working mode of the second client is the second mode), and the first client receives the first marking task assigned by the second client.

The first marking task refers to a task that the first client is required to perform the defect marking to the first original image, and the image marking approach by the first client for performing the defect marking to the first original image comprises a first marking approach, a second marking approach and a third marking approach. The first original image refers to an image, among the imperfect images, that the first client is required to perform the defect marking to.

Furthermore, the first client and the second client may be different clients, and may also be the same client, which is not limited in the embodiments of the present disclosure.

It should be noted that, when the second client assigns the first marking task to the first client, with factories as the unit, the characteristic of the distribution of the patterns in the imperfect images in the product-image database is analyzed, and the image marking approach corresponding to that is determined. Certainly, the characteristic of the distribution of the patterns in the imperfect images in the product-image database may also be analyzed with the types of the products or the process zones of the product manufacturing and so on as the units, and the image marking approach corresponding to that may be determined.

For example, the imperfect images in the product-image database include the imperfect images in the production processes of a factory 1, a factory 2 and a factory 3, and the quantity of the imperfect images in the production process of each of the factories is large, usually tens of thousands or hundreds of thousands. The second client analyzes the imperfect images in the production process of the factory 1, and if the patterns in the imperfect images corresponding to the factory 1 have the characteristic of an array-typed distribution, then it is determined that the image marking approach corresponding to the imperfect images in the production process of the factory 1 is the second marking approach, wherein the second marking approach refers to an automatic marking approach. Correspondingly, the second client analyzes the imperfect images in the production process of the factory 2, and if the patterns in the imperfect images corresponding to the factory 2 do not have the characteristic of an array-typed distribution, but the imperfect images have small differences and a simple image background, then it is determined that the image marking approach corresponding to the imperfect images in the production process of the factory 2 is the first marking approach, wherein the first marking approach refers to a semi-automatic marking approach. The second client analyzes the imperfect images in the production process of the factory 3, and if the imperfect images corresponding to the factory 3 have large differences and a complicated image background, then it is determined that the image marking approach corresponding to the imperfect images in the production process of the factory 3 is the third marking approach, wherein the third marking approach refers to a manual marking approach.

The array-typed distribution refers to that, in an imperfect image, multiple same or similar features exist, and those multiple features are distributed periodically in the imperfect image, such as pixel features fabricated on a substrate. Generally, the electric circuits of minimized products are dense, and the patterns in the imperfect images in their production processes usually have the characteristic of an array-typed distribution.

Figure 2:
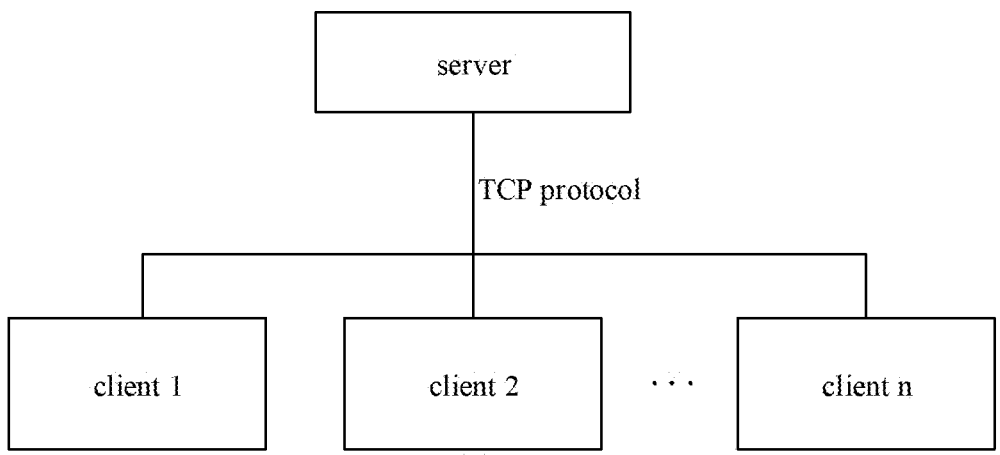
FIG. 2 shows a structural diagram of the connection between the client and the server according to an embodiment of the present disclosure.

As shown in FIG. 2, the client and the server are connected by using the Transmission Control Protocol (TCP). The client is multiple clients, which are a client 1, a client 2 to a client n. Each of the clients integrates the two working modes.

For example, the working mode of the client 1 is set to be the first mode, or, in other words, the client 1 is the first client. The working mode of the client 2 is set to be the second mode, or, in other words, the client 2 is the second client. Correspondingly, the working modes of the client 3 and the client 4 are also set be the first mode, and therefore the client 3 and the client 4 are also the first client. The client 2 connects to the server, and, according to the characteristic of the distribution of the patterns in the imperfect image in the product-image database in the server, determines the image marking approach corresponding to the first original image that the client 1, the client 3 and the client 4 are required to perform the defect marking to. The client 2 assigns the first marking task to the client 1, and the client 1 is required to perform the defect marking to the imperfect images in the production process of the factory 1, the image marking approach corresponding to which is the second marking approach. The client 2 assigns the first marking task to the client 3, and the client 3 is required to perform the defect marking to the imperfect images in the production process of the factory 2, the image marking approach corresponding to which is the first marking approach. The client 2 assigns the first marking task to the client 4, and the client 4 is required to perform the defect marking to the imperfect images in the production process of the factory 3, the image marking approach corresponding to which is the third marking approach.

Step 103: on the condition that the image marking approach is the first marking approach, according to a neural network model, determining a first marking result corresponding to the first original image.

In an embodiment of the present disclosure, when it is determined that the image marking approach corresponding to the first original image that the first client is required to perform the defect marking to is the first marking approach, i.e., the semi-automatic marking approach, according to a neural network model that is trained in advance, a first marking result corresponding to the first original image is determined. The first marking result is the result of the semi-automatic marking, and the neural network model is a supervised model.

Before the defect marking, it is required to collect some of the sample images, perform manual marking to the defect of each of the sample images to obtain the marking result, and then, according to the sample images and the marking result of each of the sample images, train the obtained neural network model, and, in the process of the defect marking, determine the first marking result corresponding to the first original image by using the trained neural network model. Therefore, the defect marking to the first original image by using the semi-automatic marking approach requires a process of artificial participation. However, in the artificial marking of the defects of the sample images, the quantity of the sample images is small, for example, 100 or 200 sample images, whereby the time consumption on the defect marking to the sample images is low, and, in the defect marking to the first original image by using the semi-automatic marking approach subsequently, the labor and the time required by the defect marking may be greatly saved.

For example, the client 2 assigns the first marking task to the client 3, and the client 3 is required to perform the defect marking to the imperfect images in the production process of the factory 2, the image marking approach corresponding to which is the first marking approach. The client 3, according to a neural network model that is trained in advance, determines the first marking result corresponding to the imperfect images in the production process of the factory 2.

Step 104: on the condition that the image marking approach is the second marking approach, according to an unsupervised algorithm model, determining a second marking result corresponding to the first original image.

In an embodiment of the present disclosure, when it is determined that the image marking approach corresponding to the first original image that the first client is required to perform the defect marking to is the second marking approach, i.e., the automatic marking approach, directly according to an unsupervised algorithm model, a second marking result corresponding to the first original image is determined. The second marking result is the result of the automatic marking, and the unsupervised algorithm model does not require an artificial training.

For example, the client 2 assigns the first marking task to the client 1, and the client 1 is required to perform the defect marking to the imperfect images in the production process of the factory 1, the image marking approach corresponding to which is the second marking approach. The client 1, directly according to an unsupervised algorithm model, determines the second marking result corresponding to the imperfect images in the production process of the factory 1.

Step 105: on the condition that the image marking approach is the third marking approach, receiving a third marking result inputted by a user into the first original image.

In an embodiment of the present disclosure, when it is determined that the image marking approach corresponding to the first original image that the first client is required to perform the defect marking to is the third marking approach, i.e., the manual marking approach, artificially, in a third image marking interface corresponding to the manual-marking module, a third marking result is added into the first original image. Accordingly, the first client receives the third marking result inputted by the user into the first original image. The third marking result is a result of the manual marking.

For example, the client 2 assigns the first marking task to the client 4, and the client 4 is required to perform the defect marking to the imperfect images in the production process of the factory 3, the image marking approach corresponding to which is the third marking approach. The client 4 receives the third marking result inputted by the user into the imperfect images in the production process of the factory 3.

Step 106: sending a target marking result to the second client, wherein the target marking result comprises any one of the first marking result, the second marking result and the third marking result.

In an embodiment of the present disclosure, the first client, after has obtained the target marking result of the first original image, sends a target marking result to the second client. The second client receives the target marking result sent by the first client. The administrator examines the target marking result sent by the first client, and inputs the examination result into the second client. On the condition that the examination result has no error, the second client sends the target marking result to the server. On the condition that the examination result has an error, the second client returns the target marking result to the first client to re-perform the defect marking.

The target marking result is any one of the first marking result, the second marking result and the third marking result. When the image marking approach corresponding to the first original image that the first client is required to perform the defect marking to is the first marking approach, the target marking result that it sends to the second client is the first marking result. When the image marking approach corresponding to the first original image that the first client is required to perform the defect marking to is the second marking approach, the target marking result that it sends to the second client is the second marking result. When the image marking approach corresponding to the first original image that the first client is required to perform the defect marking to is the third marking approach, the target marking result that it sends to the second client is the third marking result.

Particularly, the target marking result comprises a defect category and a defect position of the first original image.

In the embodiments of the present disclosure, by analyzing the first original image, to determine the image marking approach of the first original image, and, according to the neural network model or the unsupervised algorithm model, performing the defect marking to the first original image, automated defect marking is realized, which increases the speed of the defect marking to the first original image, and saves the labor and the time required by the defect marking. After the first original image is marked, the target marking result obtained after the marking may be used as the samples in the subsequent training of a deep-learning model.

Figure 3:
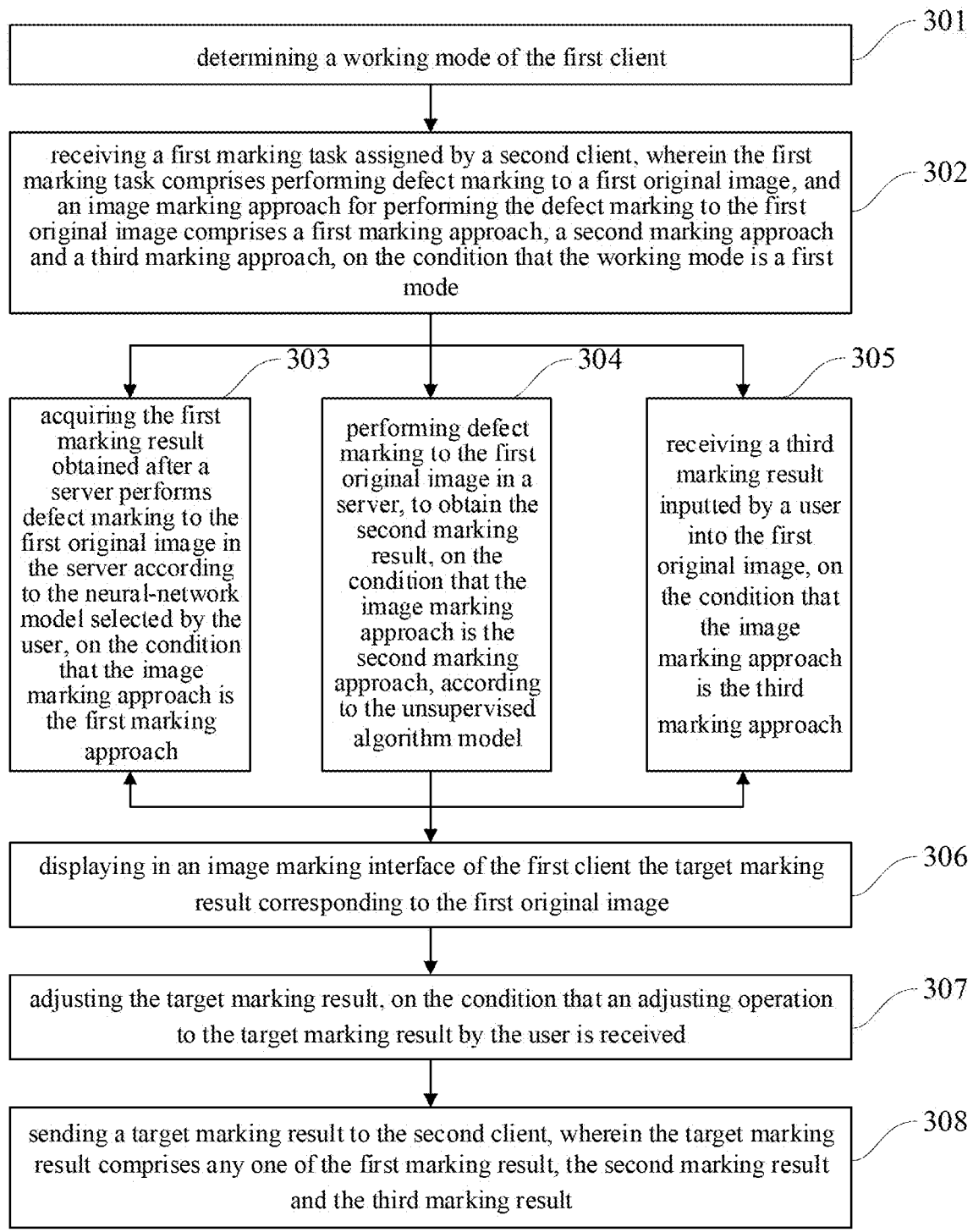
FIG. 3 shows a particular flow chart of the image marking method according to an embodiment of the present disclosure.

Referring to FIG. 3, which shows a particular flow chart of the image marking method according to an embodiment of the present disclosure, wherein the method is applied to a first client, and may particularly comprise the following steps:

Step 301: determining a working mode of the first client.

This step is similar to the above step 101 in principle, which may not be repeated here further.

Step 302: on the condition that the working mode is a first mode, receiving a first marking task assigned by a second client, wherein the first marking task comprises performing defect marking to a first original image, and an image marking approach for performing the defect marking to the first original image comprises a first marking approach, a second marking approach and a third marking approach.

Figure 4:
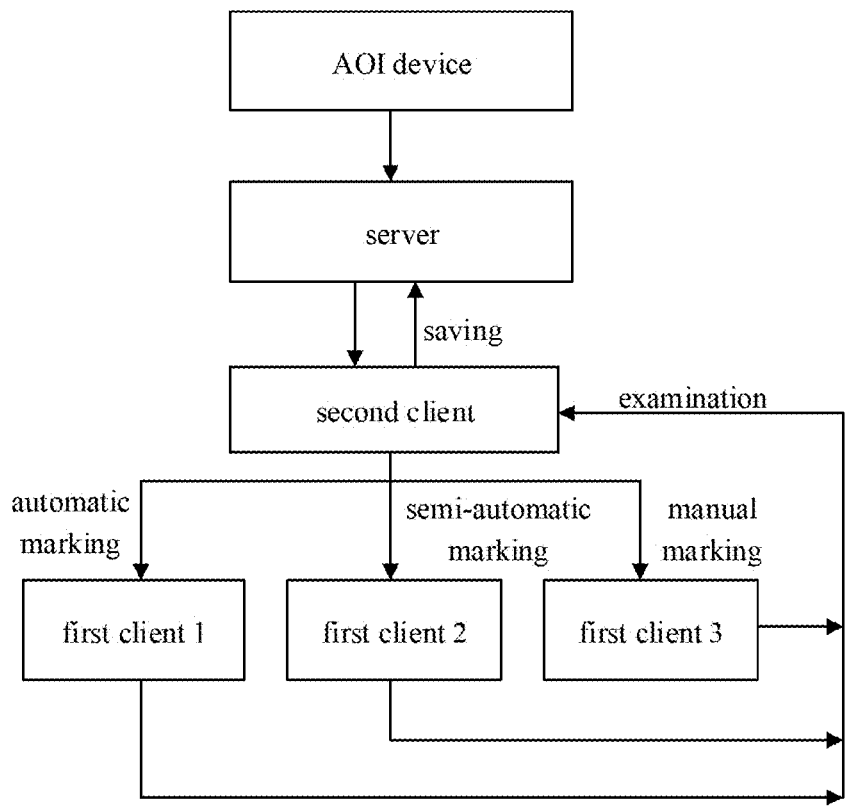
FIG. 4 shows a flow chart of the processing when the first client is in the first mode according to an embodiment of the present disclosure.

In an embodiment of the present disclosure, as shown in FIG. 4, in the process of the product fabrication, after each stage of the process, the product in the fabrication process undergoes optical checking by using an AOI device, thereby obtaining an imperfect image containing a graphic of the product defect. The AOI device sends the detected imperfect image to the server by using the File Transfer Protocol (FTP). When it is determined that the working mode of the first client is the first mode, a second client is required to assign a first marking task to the first client. The second client is required to connect to the server, and, according to the characteristic of the distribution of the patterns in the imperfect image in the product-image database in the server, determine the image marking approach corresponding to the first original image that the first client is required to perform the defect marking to. Subsequently, the second client assigns the first marking task to the first client, and the first client receives the first marking task assigned by the second client.

The first marking task refers to a task that the first client is required to perform the defect marking to the first original image, and the image marking approach by the first client for performing the defect marking to the first original image comprises a first marking approach, a second marking approach and a third marking approach, wherein the first marking approach refers to a semi-automatic marking approach, the second marking approach refers to an automatic marking approach, and the third marking approach refers to a manual marking approach.

When the patterns in the first original image are not distributed in an array, the corresponding image marking approach is the first marking approach. When the patterns in the first original image are distributed in an array, the corresponding image marking approach is the second marking approach. When the first original images have large differences and a complicated image background, the corresponding image marking approach is the third marking approach.

As shown in FIG. 4, the second client assigns the first marking task to a first client 1, a first client 2 and a first client 3. The image marking approach that the first client 1 is required to perform the defect marking to the first original image is the automatic marking approach. The image marking approach that the first client 2 is required to perform the defect marking to the first original image is the semi-automatic marking approach. The image marking approach that the first client 3 is required to perform the defect marking to the first original image is the manual marking approach.

Step 303: on the condition that the image marking approach is the first marking approach, acquiring the first marking result obtained after a server performs defect marking to the first original image in the server according to the neural network model selected by the user.

In an embodiment of the present disclosure, the first original image that the first client is required to perform the defect marking to is stored in the server, and the neural network model is also stored in the server. The neural network model is a target detection-algorithm model, and the server stores a plurality of categories of target detection-algorithm models; and each of the categories of the target detection-algorithm models is obtained by training according to a plurality of sample images of a same category and a marking result of each of the sample images acquired in advance, wherein a quantity of the sample images is less than a predetermined quantity.

The predetermined quantity may be artificially set; for example, the predetermined quantity is 100, 200, 300, 500 and so on.

It should be noted that, regarding the same type of products or the products produced by the same factory, some of the imperfect images in the production process are acquired as the sample images, manual marking is performed to the defect of each of the sample images artificially to obtain the marking result, and training is performed according to a plurality of sample images of the same category and the marking result of each of the sample images to obtain the target detection-algorithm model of the category. The difference between the target detection-algorithm models of different categories is merely that the parameter settings in the models are different.

When the patterns in the first original image are not distributed in an array, the corresponding image marking approach is the first marking approach. When it is determined that the image marking approach corresponding to the first original image that the first client is required to perform the defect marking to is the first marking approach, i.e., the semi-automatic marking approach, the user selects in the first client the neural network model corresponding to the first original image that is required to undergo the defect marking, the first client sends an identifier of the neural network model selected by the user to the server, and the server, according to the identifier of the neural network model that is selected by the user and sent by the first client, acquires the neural network model of the corresponding category stored in the server. Subsequently, the server, according to the neural network model selected by the user, performs the defect marking to the first original image in the server, to obtain a first marking result, the server sends the first marking result to the first client, and then the first client acquires the first marking result obtained after that the server performs the defect marking to the first original image according to the neural network model selected by the user.

It should be noted that the first original image that the first client is required to perform the defect marking to is stored in the server, and the first client performs the defect marking to the first original image by remotely connecting to the server. Certainly, the first client may also download the first original image from the server, and perform the defect marking to the first original image in the first client. However, the method of performing the defect marking by remotely connecting to the server, as compared with the method of performing the defect marking by downloading in to the first client, may increase the speed of the defect marking. That is particularly because usually tens of thousands or hundreds of thousands of first original images are in the server, and, if the first client is to download all of the first original images, the first client requires a very large storage capacity, and that has very high requirements on the network bandwidth between the first client and the server, the downloading duration and so on. However, by remotely connecting to the server, the speed of the defect marking may be increased, and the requirements on the hardware storage device and the network bandwidth of the first client may be reduced.

In an alternative embodiment of the present disclosure, the step 303 may particularly comprise a sub-step S11 to a sub-step S15:

Sub-step S11: on the condition that the image marking approach is the first marking approach, on the condition that a first operation by the user to a first marking module in a functional-module interface of the first client is received, displaying a first image marking interface corresponding to the first marking module;

Sub-step S12: on the condition that a second operation by the user to a configuration file in the first image marking interface is received, connecting the first client to the server;

Sub-step S13: according to the image address of the first original image in the server, sending a folder opening instruction to the server, to open the folder in the server where the first original image is located;

Sub-step S14: on the condition that a third operation by the user to a model category in the first image marking interface is received, determining the neural network model selected by the user; and Sub-step S15: on the condition that a fourth operation by the user to an image-marking option in the first image marking interface is received, acquiring the first marking result obtained after the server performs the defect marking to the first original image in the server according to the neural network model.

Figure 5:
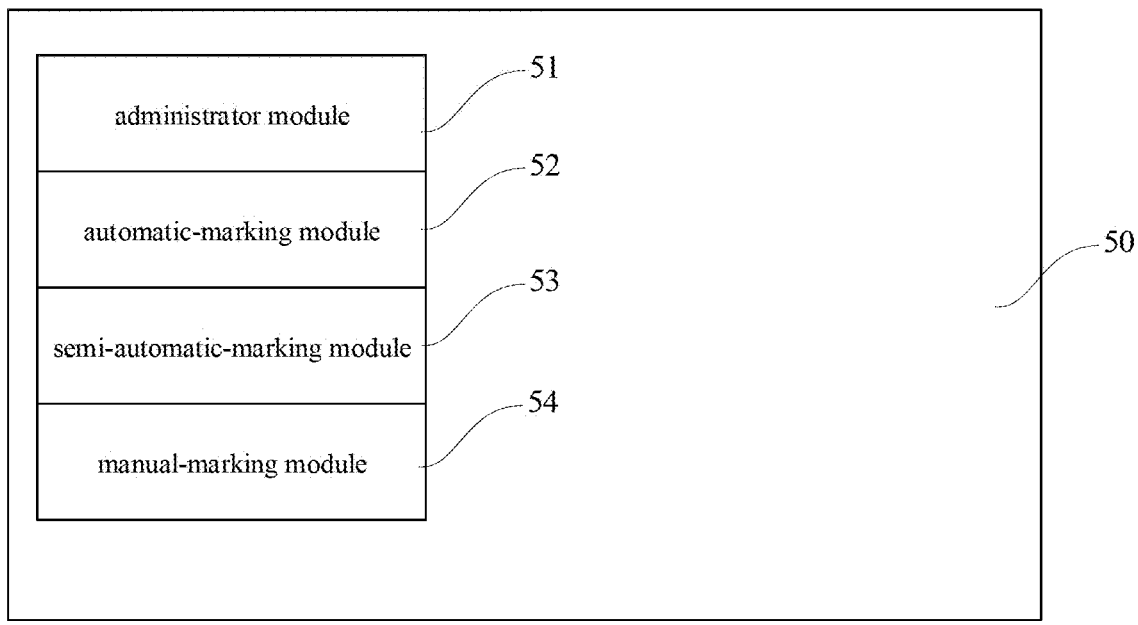
FIG. 5 shows a schematic diagram of the functional-module interface according to an embodiment of the present disclosure.

As shown in FIG. 5, a functional-module interface 50 of the first client comprises an administrator module 51, an automatic-marking module 52, a semi-automatic-marking module 53 and a manual-marking module 54, wherein the automatic-marking module 52 is a second marking module, the semi-automatic-marking module 53 is the first marking module, and the manual-marking module 54 is a third marking module.

When the user has performed a triggering operation to the administrator module 51, the first client receives the triggering operation by the user to the administrator module 51 in the functional-module interface 50 of the first client, and displays a managing interface at the first client. When it is determined that the image marking approach corresponding to the first original image that the first client is required to perform the defect marking to is the first marking approach, the user may perform a triggering operation to the semi-automatic-marking module 53.

Accordingly, the first client receives the first operation by the user to the semi-automatic-marking module 53 in the functional-module interface 50 of the first client, and, subsequently, displays a first image marking interface 60 corresponding to the semi-automatic-marking module 53 shown in FIG. 6.

For example, the device corresponding to the first client is connected to a mouse. The user clicks by using the mouse the position where the administrator module 51 in the functional-module interface 50 of the first client is located, to realize the triggering operation to the administrator module 51. Alternatively, the user performs touch controlling by using a finger to the position where the administrator module 51 in the functional-module interface 50 is located, to realize the triggering operation to the administrator module 51. Correspondingly, the first operation by the user to the semi-automatic-marking module 53 in the functional-module interface 50 of the first client may also be realized by using the mouse or by finger touch controlling.

Figure 6:
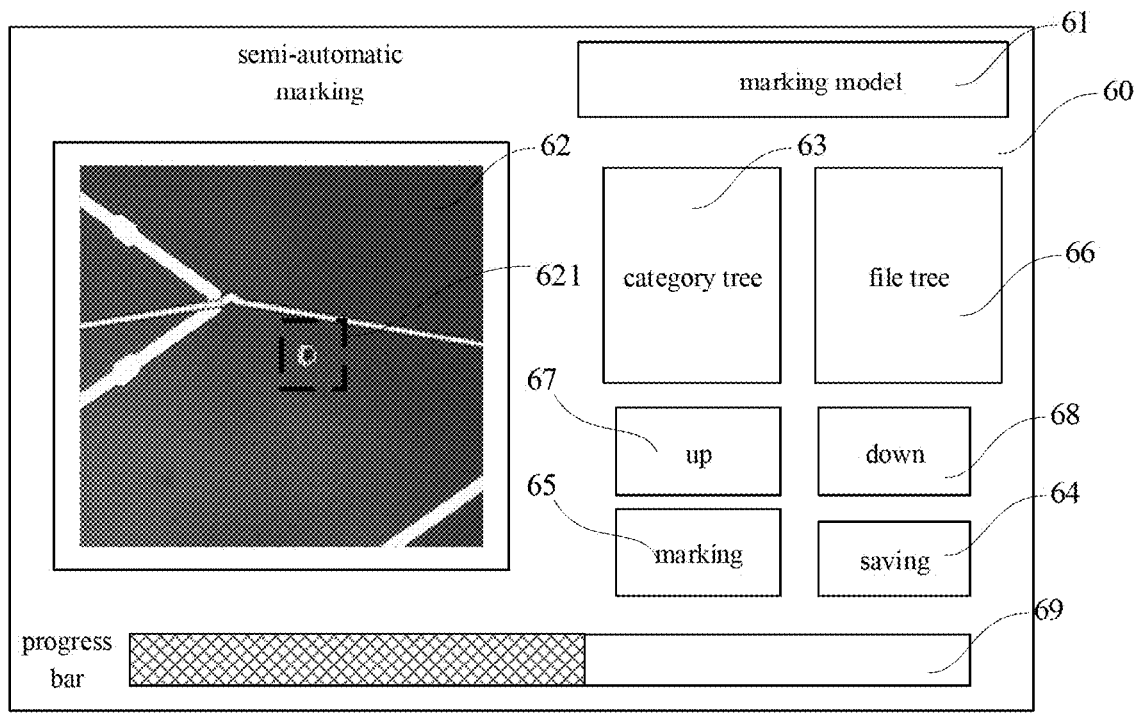
FIG. 6 shows a schematic diagram of the first image marking interface according to an embodiment of the present disclosure.

After the first image marking interface 60 shown in FIG. 6 is displayed, the first image marking interface 60 displays a configuration-file option (not shown in FIG. 6), and the user may perform parameter configuration to the configuration file in the first image marking interface 60. Accordingly, the first client receives the second operation by the user to the configuration file in the first image marking interface 60, and connects the first client to the server.

After the first client and the server are connected, due to the first original image is stored in the server, the second client is also required to send the image address of the first original image in the server to the first client, the user may input the image address into the first image marking interface 60 of the first client, the first client sends the folder opening instruction to the server according to the image address, and the server, after has received the folder opening instruction, opens the folder in the server where the first original image is located.

The first image marking interface 60 further displays a marking-model option 61. Subsequently, the user selects a suitable model category from the marking-model option 61 according to the first original image. Accordingly, the first client receives the third operation by the user to the model category in the first image marking interface 60, determining the neural network model selected by the user.

Finally, the user may perform a triggering operation to the image-marking option (not shown in FIG. 6) in the first image marking interface 60. Accordingly, the first client receives the fourth operation by the user to the image-marking option in the first image marking interface 60, and sends an identifier of the neural network model selected by the user to the server. The server, according to the identifier of the neural network model that is selected by the user and sent by the first client, acquires the neural network model of the corresponding category stored in the server. Subsequently, the server, according to the neural network model selected by the user, performs the defect marking to the first original image in the server, to obtain a first marking result, the server sends the first marking result to the first client, and then the first client acquires the first marking result obtained after that the server performs the defect marking to the first original image according to the neural network model selected by the user.

The particular process of the server, according to the neural network model selected by the user, performing the defect marking to the first original image in the server comprises: performing feature extraction to the first original image in the server, to obtain a characteristic image: extracting a target candidate region from the characteristic image; performing ROI Pooling processing to the characteristic image corresponding to the target candidate region, to obtain characteristic images of a predetermined size: and classifying the characteristic images of the predetermined size, to obtain a first marking result.

Firstly, the first original image is inputted into a deep convolutional neural network, and passes through multiple convolutional layers, the activation layer and the pooling layer, to realize the feature extraction to the first original image, to obtain the characteristic image corresponding to the whole first original image. Subsequently, the characteristic image corresponding to the first original image is inputted into a Region Proposal Network (RPN), to realize the extraction of a candidate region of the characteristic image. By secondary classification of the candidate region of the characteristic image, the target candidate region is screened out, and the coordinate position of the target candidate region is determined. Subsequently, because the sizes of the extracted target candidate regions are not equal, but the subsequent fully connected layer requires to be inputted characteristic images of equal sizes, ROI Pooling processing is performed to the characteristic image corresponding to the target candidate region; in other words, the target candidate regions are segmented into grids of a predetermined size, each of the grids is mapped into a corresponding characteristic image, and the maximum values in the grids are extracted, to obtain characteristic images of a predetermined size. Finally, the characteristic images of the predetermined size are inputted into the fully connected layer and a softmax network, the characteristic images of the predetermined size are classified, to obtain the defect categories, and the coordinate position of the target candidate region previously obtained is adjusted, to obtain the coordinate positions corresponding to the characteristic images of the predetermined size; in other words, the first marking result comprises the defect category and the defect position of the first original image.

The target detection-algorithm model may realize, from the inputting of the first original image, outputting the position and the category of the defect in the first original image, and has a good capacity of defect detection to imperfect images not having an array-typed distribution.

It should be noted that the particular steps of the target detection-algorithm model according to the embodiments of the present disclosure are not limited to the above-described steps of the feature extraction, the extraction of the target candidate region, the ROI Pooling processing and the classifying of the characteristic images of the predetermined size, and all of the target detection-algorithm models that may realize the defect marking to the first original image are applicable.

Step 304: on the condition that the image marking approach is the second marking approach, according to the unsupervised algorithm model, performing defect marking to the first original image in a server, to obtain the second marking result.

In an embodiment of the present disclosure, the first original image that the first client is required to perform the defect marking to is stored in the server, while the unsupervised algorithm model is stored in the first client. The unsupervised algorithm model is a fast-Fourier-transform-algorithm model; in other words, the fast-Fourier-transform-algorithm model is stored in the first client.

When the patterns in the first original image are distributed in an array, the corresponding image marking approach is the second marking approach. When it is determined that the image marking approach corresponding to the first original image that the first client is required to perform the defect marking to is the second marking approach, i.e., the automatic marking approach, according to the unsupervised algorithm model stored in the first client, defect marking is performed to the first original image in a server, to obtain the second marking result.

It should be noted that Fourier transform is usually applied in the field of signal processing, to convert a time-domain signal into the amplitudes and the phases corresponding to different frequencies, and the frequency spectrum is the exhibition of the time-domain signal in the frequency domain. However, when it is used in image processing, the frequency of an image is an indicator characterizing the degree of the grayscale variation in the image, and is the gradient of the grayscale in the plane space, and the physical significance of Fourier transform is the transformation from a grayscale distribution function of the image into a frequency distribution function of the image. The frequency spectrogram obtained by performing two-dimensional Fourier transform to the first original image is the distribution diagram of the image gradient. The bright spots with different darknesses and brightnesses obtained on the Fourier frequency spectrogram actually represent the degrees of the difference between a certain point in the first original image and a neighboring-region point, i.e., the magnitude of the gradient, i.e., the magnitude of the frequency of that point.

Regarding a first original image in which the patterns are distributed in an array, if a point of the first original image has a defect, then the image gradient at that point has a sudden change, which is reflected as a bright spot at that point in the Fourier frequency spectrogram. On the contrary, if the first original image does not have a defect, then the gradients in the first original image are even, and the frequency spectrogram obtained after the Fourier transform has no bright spot.

By performing the defect marking to the first original image in the server by using the fast-Fourier-transform-algorithm model, the defect locating to the first original image may be directly completed based on the law of the array-typed distribution of the first original image, thereby quickly determining the second marking result.

It should be noted that the unsupervised algorithm model according to the embodiments of the present disclosure is not limited to the fast-Fourier-transform-algorithm model, and, certainly, may also be another model.

In an alternative embodiment of the present disclosure, the step 304 may particularly comprise a sub-step S21 to a sub-step S24:

Sub-step S21: on the condition that the image marking approach is the second marking approach, on the condition that a fifth operation by the user to a second marking module in the functional-module interface of the first client is received, displaying a second image marking interface corresponding to the second marking module:

Sub-step S22: on the condition that a sixth operation by the user to a configuration file in the second image marking interface is received, connecting the first client to the server;

Sub-step S23: according to the image address of the first original image in the server, sending a folder opening instruction to the server, to open the folder in the server where the first original image is located; and Sub-step S24: on the condition that a seventh operation by the user to an image-marking option in the second image marking interface is received, according to the unsupervised algorithm model, performing defect marking to the first original image in the server, to obtain the second marking result.

As shown in FIG. 5, when it is determined that the image marking approach corresponding to the first original image that the first client is required to perform the defect marking to is the second marking approach, the user may perform a triggering operation to the automatic-marking module 52. Accordingly, the first client receives the fifth operation by the user to the automatic-marking module 52 in the functional-module interface 50 of the first client, and, subsequently, displays a second image marking interface 70 corresponding to the automatic-marking module 52 shown in FIG. 7.

After the second image marking interface 70 corresponding to the automatic-marking module 52 is displayed, the second image marking interface 70 displays a configuration-file option (not shown in FIG. 7), and the user may perform parameter configuration to the configuration file in the second image marking interface 70. Accordingly, the first client receives the sixth operation by the user to the configuration file in the second image marking interface 70, and connects the first client to the server.

After the first client and the server are connected, due to the first original image is stored in the server, the second client is also required to send the image address of the first original image in the server to the first client, the user may input the image address into the second image marking interface 70 of the first client, the first client sends the folder opening instruction to the server according to the image address, and the server, after has received the folder opening instruction, opens the folder in the server where the first original image is located.

Finally, the user may perform a triggering operation to the image-marking option (not shown in FIG. 7) in the second image marking interface 70. Accordingly, the first client receives the seventh operation by the user to the image-marking option in the second image marking interface 70, and, according to the unsupervised algorithm model stored in the first client, performs defect marking to the first original image in the server, to obtain the second marking result.

It should be noted that the second image marking interface 70 is similar to the first image marking interface 60, and they merely differ in that the second image marking interface 70 is not required to display the marking-model option 61.

Step 305: on the condition that the image marking approach is the third marking approach, receiving a third marking result inputted by a user into the first original image.

In an embodiment of the present disclosure, as shown in FIG. 5, when it is determined that the image marking approach corresponding to the first original image that the first client is required to perform the defect marking to is the third marking approach, the user may perform a triggering operation to the manual-marking module 54. Accordingly, the first client receives the eleventh operation by the user to the manual-marking module 54 in the functional-module interface 50 of the first client, and, subsequently, displays the third image marking interface corresponding to the manual-marking module 54.

The third image marking interface displays the first original image, a category-tree option corresponding to the defect category, a frame option corresponding to the defect position, a saving option and a marking option. The user, according to practical demands, selects the corresponding frame from the frame option, and adds into the defect position of the first original image; and, according to the defect category of the first original image, selects the corresponding defect category from the category-tree option, and adds into the first original image, to realize the defect marking to the first original image. Accordingly, the first client receives the third marking result inputted by the user into the first original image.

Subsequently, the saving of the third marking result may be realized by a triggering operation to the saving option. Alternatively, if the user cannot determine whether the third marking result is correct, the marking of the third marking result is realized by a triggering operation to the marking option, so as to subsequently determine the accuracy of the third marking result again or perform adjustment.

It should be noted that, in the training of the target detection-algorithm model of the category according to a plurality of sample images of the same category and the marking result of each of the sample images, the marking results of the sample images are manually marked to the defect of each of the sample images artificially, and the particular process of the manual marking may refer to the particular process of the step 305 of inputting the third marking result into the first original image by the user.

Step 306: displaying in an image marking interface of the first client the target marking result corresponding to the first original image.

In an embodiment of the present disclosure, the first client, after has obtained the target marking result of the first original image, displays in an image marking interface of the first client the target marking result corresponding to the first original image.

The target marking result is anyone of the first marking result, the second marking result and the third marking result.

When the target marking result is the first marking result, the image marking interface is the first image marking interface 60 shown in FIG. 6, the first marking result is displayed at the region 62 in FIG. 6, and the first marking result corresponding to the first original image is displayed at the region 62. It may be seen that the patterns in the first original image displayed at the region 62 are not distributed in an array, and a defect position in the first original image is displayed at the region 621.

Figure 7:
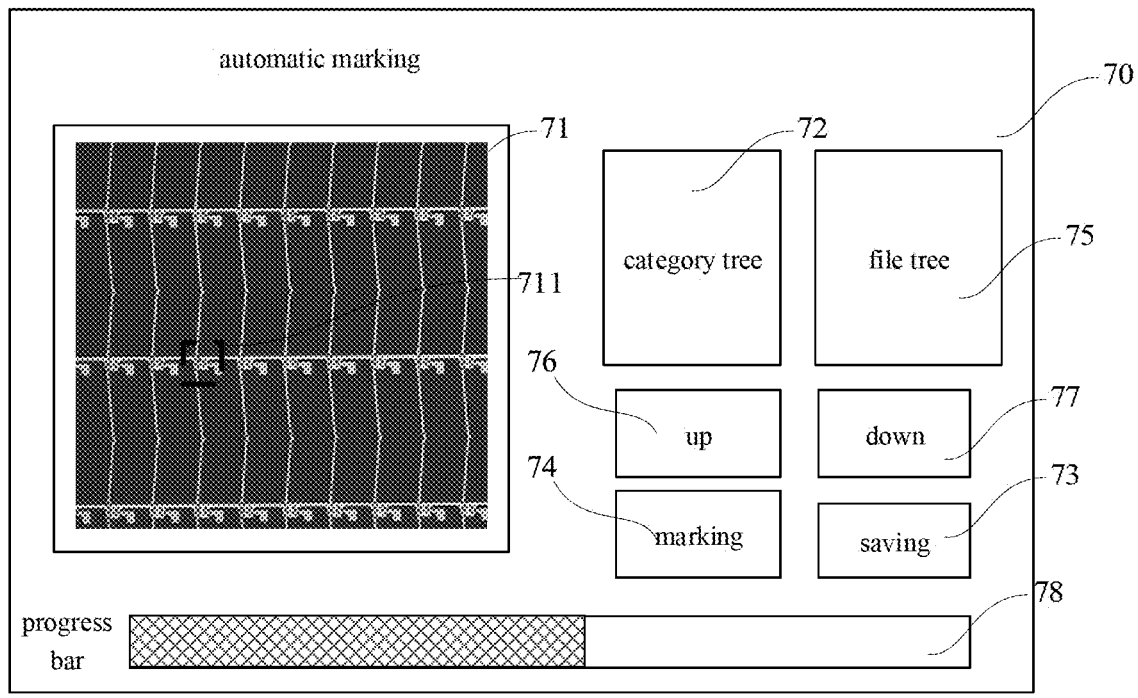
FIG. 7 shows a schematic diagram of the second image marking interface according to an embodiment of the present disclosure.

When the target marking result is the second marking result, the image marking interface is the second image marking interface 70 shown in FIG. 7, the second marking result is displayed at the region 71 in FIG. 7, and the second marking result corresponding to the first original image is displayed at the region 71. It may be seen that the patterns in the first original image displayed at the region 71 are distributed in an array, the patterns in the first original image displayed at the region 71 are pixel features, wherein the pixel features are distributed in an array, and a defect position in the first original image is displayed at the region 711.

When the target marking result is the third marking result, the image marking interface is the third image marking interface.

Particularly, the target marking result comprises a defect category and a defect position of the first original image. The defect categories include: particles, remains, lines, holes, splashes, wrinkles, film colors, bubbles and so on. Each of the defect categories may further be classified into more sub-classes; for example, the categories of particles may, based on the different morphologies of the defects of particles, be classified into P1 (Normal Particle), P2 (Sand Particle), P3 (Wall Particle) and so on. The defect position is used to indicate the particular coordinate position in the first original image where the defect is located, and comprises the particular coordinate position on the circuit board where the defect is located, and the relation between the defect and the background circuit, for example, whether the defect completely falls within the Gate (grids or grid lines), whether the defect intersects with the Gate, whether the defect is located in an adjacent region outside the Gate, and so on. Furthermore, the target marking result may further comprise the size of the defect in the first original image, wherein the size of the defect comprises the length of the defect, the region area of the defect, and so on.

Step 307: adjusting the target marking result on the condition that an adjusting operation to the target marking result by the user is received.

In an embodiment of the present disclosure, the user may preview the target marking result corresponding to the first original image displayed in the image marking interface of the first client, and, when has determined that the target marking result corresponding to a certain first original image is not accurate, may perform a triggering operation to the target marking result. Accordingly, the first client receives the adjusting operation by the user to the target marking result, and, subsequently, adjusts the target marking result. Particularly, the defect position and/or the defect category may be adjusted.

As shown in FIG. 6, when the defect category in the target marking result is erroneous, the user may perform a triggering operation to a category-tree option 63 in the first image marking interface 60, and select the correct defect category from the category-tree option 63, to replace the defect category originally marked. Alternatively, as shown in FIG. 7, when the defect category in the target marking result is erroneous, the user may perform a triggering operation to a category-tree option 72 in a second marking interface 70, and select the correct defect category from the category-tree option 72, to replace the defect category originally marked.

In an alternative embodiment of the present disclosure, after the step 307, the method further comprises a step S31: on the condition that an eighth operation to a saving option in the image marking interface by the user is received, saving the target marking result obtained after the adjustment.

The user, when has completed the adjustment to the target marking result corresponding to one first original image, may perform a triggering operation to a saving option in the image marking interface. Accordingly, the first client receives the eighth operation by the user to the saving option in the image marking interface, and, subsequently, saves the target marking result corresponding to the one first original image obtained after the adjustment.

As shown in FIG. 6, the user, when has completed the adjustment to the first marking result corresponding to one first original image, may perform a triggering operation to a saving option 64 in the first image marking interface 60, and save the first marking result obtained after the adjustment. Alternatively, as shown in FIG. 7, the user, when has completed the adjustment to the second marking result corresponding to one first original image, may perform a triggering operation to a saving option 73 in the second marking interface 70, and save the second marking result obtained after the adjustment.

Certainly, not only the saving option may realize saving the target marking result of one first original image obtained after the adjustment, but also the saving option may be clicked after the adjustment to all of the target marking results corresponding to all of the first original images in the first marking task is completed, to realize saving the target marking results corresponding to all of the first original images obtained after the adjustment.

In practical applications, after the step 306, the method further comprises a step S32: on the condition that a ninth operation to a marking option in the image marking interface by the user is received, marking the target marking result, to obtain a marking result to be processed.

In an embodiment of the present disclosure, the user may preview the target marking result corresponding to the first original image displayed in the image marking interface of the first client, and, if the user cannot determine whether the target marking result is correct, the user may perform a triggering operation to a marking option in the image marking interface. Accordingly, the first client receives the ninth operation by the user to the marking option in the image marking interface, and, subsequently, marks the target marking result, to obtain a marking result to be processed, so as to subsequently determine the accuracy of the target marking result again or perform adjustment. If the target marking result is to be adjusted subsequently, the step 307 may be executed.

As shown in FIG. 6, if the user cannot determine whether the first marking result corresponding to the first original image is correct, the user may perform a triggering operation to a marking option 65 in the first image marking interface 60. Accordingly, the first client marks the first marking result, to obtain a marking result to be processed. Alternatively, as shown in FIG. 7, if the user cannot determine whether the second marking result corresponding to the first original image is correct, the user may perform a triggering operation to a marking option 74 in the second marking interface 70. Accordingly, the first client marks the second marking result, to obtain a marking result to be processed.

It should be noted that FIG. 6 further comprises a file-tree option 66, an up-skipping option 67, a down-skipping option 68 and a progress bar 69. The file-tree option 66 comprises the list of the first original images in the first marking task. After the up-skipping option 67 is clicked, the first marking result of the last one first original image may be displayed at the region 62 of the first image marking interface 60. After the down-skipping option 68 is clicked, the first marking result of the next one first original image may be displayed at the region 62 of the first image marking interface 60. The progress bar 69 is used to display the progress of the marking to the first original images. FIG. 7 further comprises a file-tree option 75, an up-skipping option 76, a down-skipping option 77 and a progress bar 78. The particular functions of the file-tree option 75, the up-skipping option 76, the down-skipping option 77 and the progress bar 78 are similar to the functions of the corresponding options in FIG. 6, and, in order to avoid replication, are not discussed here further.

Step 308: sending a target marking result to the second client, wherein the target marking result comprises any one of the first marking result, the second marking result and the third marking result.

In an embodiment of the present disclosure, after the target marking result is adjusted, the target marking result obtained after the adjustment is sent to the second client. As shown in FIG. 4, the second client receives the target marking result sent by the first client. The administrator examines the target marking result sent by the first client, and inputs the examination result into the second client. On the condition that the examination result has no error, the second client sends the target marking result to the server for saving. On the condition that the examination result has an error, the second client returns the target marking result to the first client to re-perform the defect marking.

Particularly, the step 308 comprises a sub-step S330, a sub-step S340 and a sub-step S350:

Sub-step S330: on the condition that a tenth operation to a submitting option in the image marking interface by the user is received, determining whether the marking result to be processed exists in the first original image in the first marking task;

Sub-step S340: on the condition that the marking result to be processed does not exist, sending the target marking result to the second client; and Sub-step S350: on the condition that the marking result to be processed exists, displaying a prompt box in the image marking interface, to prompt the user to adjust or save the marking result to be processed.

The image marking interface displays a submitting option. The user determines that the target marking results of all of the first original images in the first marking task are correct, performs a triggering operation to the submitting option. Accordingly, the first client receives the tenth operation by the user to the submitting option in the image marking interface, and, subsequently, determines whether the marking result to be processed exists in the first original image in the first marking task.

If the first original image in the first marking task does not have the marking result to be processed, the target marking result is sent to the second client. If the marking result to be processed exists in the first original image in the first marking task, a prompt box is popped up in the image marking interface, to prompt the user to adjust or save the marking result to be processed. Alternatively, the prompt box popped up in the image marking interface may also be used to prompt the user whether the target marking result continues to be sent.

In the embodiments of the present disclosure, by analyzing the first original image, to determine the image marking approach of the first original image, and, according to the neural network model or the unsupervised algorithm model, performing the defect marking to the first original image, automated defect marking is realized, which increases the speed of the defect marking to the first original image, and saves the labor and the time required by the defect marking. The target marking result obtained after the marking may be adjusted subsequently, whereby the target marking result sent to the second client is more accurate.

Figure 8:
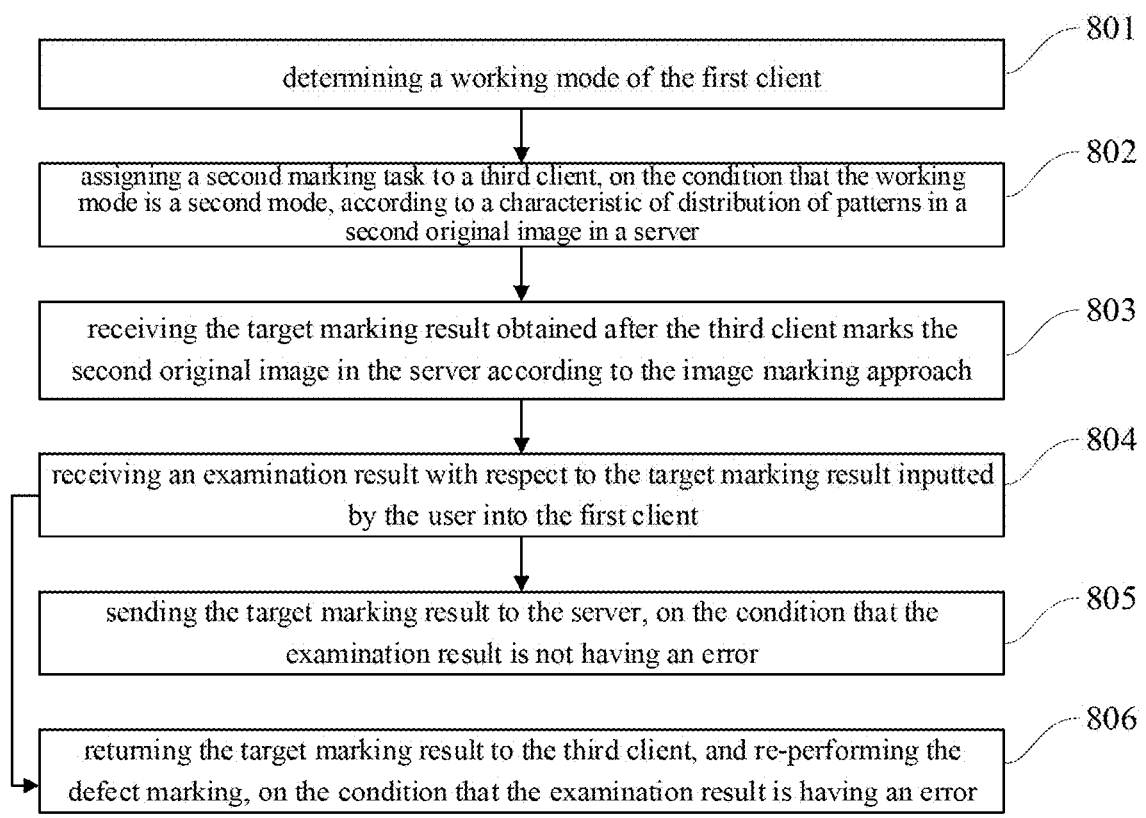
FIG. 8 shows a flow chart of the image marking method according to another embodiment of the present disclosure.

Referring to FIG. 8, which shows a flow chart of the image marking method according to another embodiment of the present disclosure, wherein the method is applied to a first client, and may particularly comprise the following steps:

Step 801: determining a working mode of the first client.

This step is similar to the above step 101 in principle, which may not be repeated here further.

Step 802: on the condition that the working mode is a second mode, according to a characteristic of distribution of patterns in a second original image in a server, assigning a second marking task to a third client.

Figure 9:
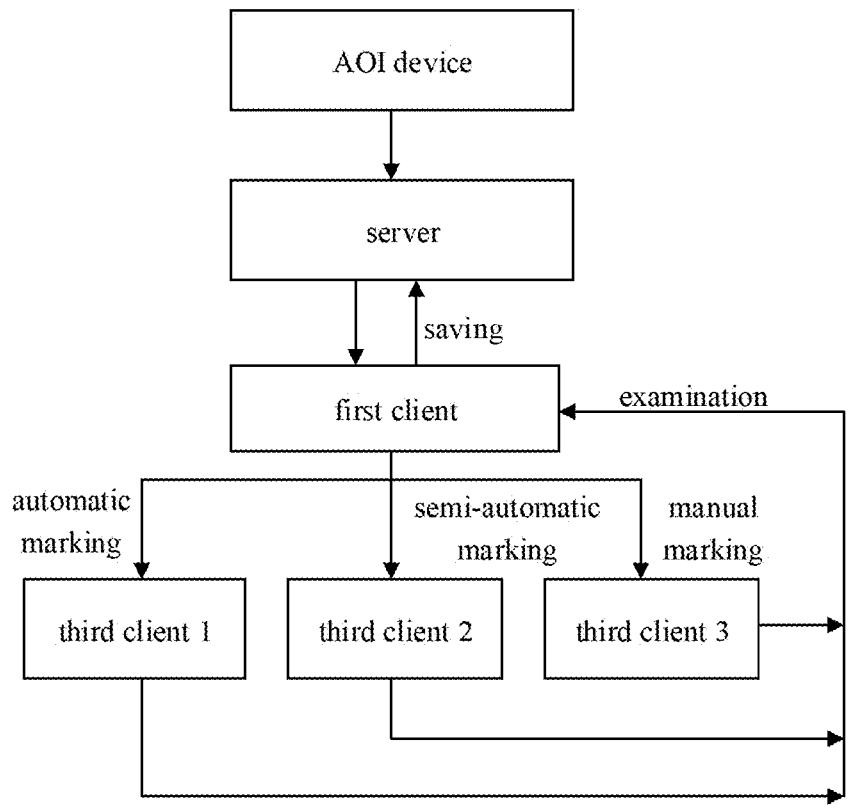
FIG. 9 shows a flow chart of the processing when the first client is in the second mode according to an embodiment of the present disclosure.

In an embodiment of the present disclosure, as shown in FIG. 9, the AOI device sends the detected imperfect image to a server. When it is determined that the working mode of the first client is the second mode, the first client is required to assign a second marking task to the third client. The first client connects to the server, and, according to the characteristic of the distribution of the patterns in the imperfect image in the product-image database in the server, determines the image marking approach corresponding to the second original image that the third client is required to perform the defect marking to. Subsequently, the first client assigns the second marking task to the third client.

The second marking task refers to a task that the third client is required to perform the defect marking to the second original image, and the image marking approach of the third client for performing the defect marking to the second original image comprises a first marking approach, a second marking approach and a third marking approach, wherein the first marking approach refers to a semi-automatic marking approach, the second marking approach refers to an automatic marking approach, and the third marking approach refers to a manual marking approach.

As shown in FIG. 9, the first client assigns the second marking task to a third client 1, a third client 2 and a third client 3. The image marking approach that the third client 1 is required to perform the defect marking to the second original image is the automatic marking approach. The image marking approach that the third client 2 is required to perform the defect marking to the second original image is the semi-automatic marking approach. The image marking approach that the third client 3 is required to perform the defect marking to the second original image is the manual marking approach.

Step 803: receiving the target marking result obtained after the third client marks the second original image in the server according to the image marking approach.

In an embodiment of the present disclosure, the third client, according to the second marking task assigned by the first client, performs defect marking to the second original image. The second original image refers to an image, among the imperfect images, that the third client is required to perform the defect marking to. The second original image and the first original image may be the same image, and, merely because the clients performing the defect marking are different, it is distinguished as the first original image and the second original image, wherein the first original image is marked by the first client, while the second original image is marked by the third client.

The third client performs the defect marking to the second original image, to obtain the target marking result. The third client sends the target marking result to the first client. Accordingly, the first client receives the target marking result obtained after the third client marks the second original image in the server according to the image marking approach.

It should be noted that the particular process of the third client performing the defect marking to the second original image is similar to the process of the first client performing the defect marking in the first mode, and is not discussed here further.

Step 804: receiving an examination result with respect to the target marking result inputted by the user into the first client.

In an embodiment of the present disclosure, as shown in FIG. 9, the user (i.e., the administrator) examines the target marking result sent by the third client, and inputs the examination result with respect to the target marking result into the first client. Accordingly, the first client receives the examination result with respect to the target marking result inputted by the user into the first client.

Step 805: on the condition that the examination result has an error, sending the target marking result to the server.

In an embodiment of the present disclosure, as shown in FIG. 9, if the examination result inputted by the user into the first client is not having an error, the target marking result is sent to the server. The server stores the target marking result sent by the first client to a specified position.

Step 806: on the condition that the examination result has an error, returning the target marking result to the third client, and re-performing the defect marking.

In an embodiment of the present disclosure, if the examination result inputted by the user into the first client is having an error, or, in other words, the target marking result sent by the third client is not correct, the target marking result is returned to the third client, and the defect marking is re-performed. The third client performs the defect marking to the second original image again, and sends to the first client again for examination.

In the embodiments of the present disclosure, by analyzing the second original image, to determine the image marking approach of the second original image, and, according to the neural network model or the unsupervised algorithm model, performing the defect marking to the second original image, automated defect marking is realized, which increases the speed of the defect marking to the second original image, and saves the labor and the time required by the defect marking.

Figure 10:
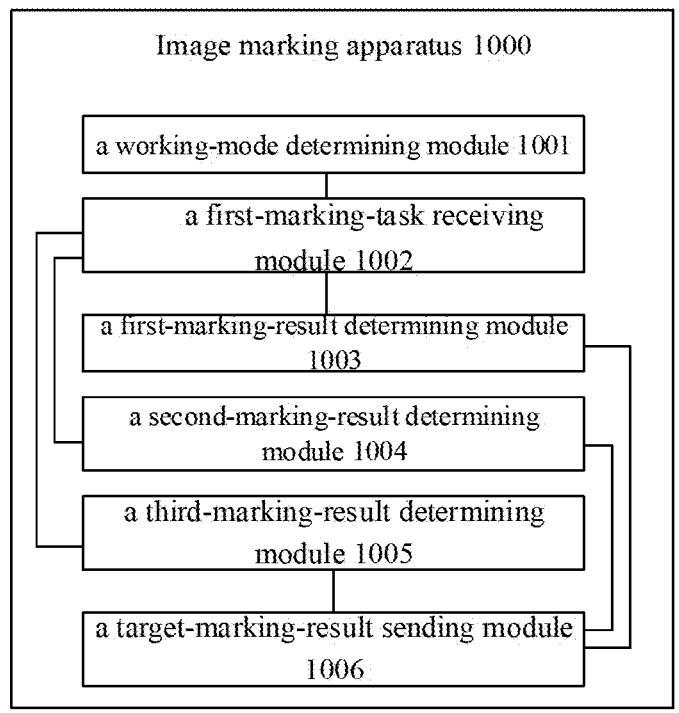
FIG. 10 shows a structural block diagram of the image marking apparatus according to an embodiment of the present disclosure.

Referring to FIG. 10, which shows a structural block diagram of the image marking apparatus according to an embodiment of the present disclosure.

The image marking apparatus 1000 is applied to a first client, and the image marking apparatus 1000 comprises:

a working-mode determining module 1001 configured for determining a working mode of the first client:

a first-marking-task receiving module 1002 configured for, on the condition that the working mode is a first mode, receiving a first marking task assigned by a second client, wherein the first marking task comprises performing defect marking to a first original image, and an image marking approach for performing the defect marking to the first original image comprises a first marking approach, a second marking approach and a third marking approach;

a first-marking-result determining module 1003 configured for, on the condition that the image marking approach is the first marking approach, according to a neural network model, determining a first marking result corresponding to the first original image;

a second-marking-result determining module 1004 configured for, on the condition that the image marking approach is the second marking approach, according to an unsupervised algorithm model, determining a second marking result corresponding to the first original image:

a third-marking-result determining module 1005 configured for, on the condition that the image marking approach is the third marking approach, receiving a third marking result inputted by a user into the first original image: and a target-marking-result sending module 1006 configured for sending a target marking result to the second client, wherein the target marking result comprises any one of the first marking result, the second marking result and the third marking result.

Optionally, the first-marking-result determining module 1003 comprises:

a first-marking-result determining submodule configured for, on the condition that the image marking approach is the first marking approach, acquiring the first marking result obtained after a server performs defect marking to the first original image in the server according to the neural network model selected by the user.

When the patterns in the first original image are not distributed in an array, the image marking approach is the first marking approach; the neural network model is a target detection-algorithm model, and the server stores a plurality of categories of target detection-algorithm models; and each of the categories of the target detection-algorithm models is obtained by training according to a plurality of sample images of a same category and a marking result acquired in advance of each of the sample images, wherein a quantity of the sample images is less than a predetermined quantity.

Optionally, the second-marking-result determining module 1004 comprises:

a second-marking-result determining submodule configured for, on the condition that the image marking approach is the second marking approach, according to the unsupervised algorithm model, performing defect marking to the first original image in a server, to obtain the second marking result.

When the patterns in the first original image are distributed in an array, the image marking approach is the second marking approach; and the unsupervised algorithm model is a fast-Fourier-transform-algorithm model, and the fast-Fourier-transform-algorithm model is stored in the first client.

Optionally, the image marking apparatus 1000 further comprises:

a target-marking-result displaying module configured for displaying in an image marking interface of the first client the target marking result corresponding to the first original image; and a target-marking-result adjusting module configured for, on the condition that an adjusting operation to the target marking result by the user is received, adjusting the target marking result.

Optionally, the target marking result comprises a defect category and a defect position of the first original image.

Optionally, the image marking apparatus 1000 further comprises:

a second-marking-task assigning module configured for, on the condition that the working mode is a second mode, according to a characteristic of distribution of patterns in a second original image in a server, assigning a second marking task to a third client, wherein the second marking task refers to a task that the third client is required to perform defect marking to the second original image, and the image marking approach of the third client for performing the defect marking to the second original image comprises a first marking approach, a second marking approach and a third marking approach; and a target-marking-result receiving module configured for receiving the target marking result obtained after the third client marks the second original image in the server according to the image marking approach.

Optionally, the image marking apparatus 1000 further comprises:

an examination-result receiving module configured for receiving an examination result with respect to the target marking result inputted by the user into the first client;

a result sending module configured for, on the condition that the examination result has no error, sending the target marking result to the server; and a result returning module configured for, on the condition that the examination result is having an error, returning the target marking result to the third client, and re-performing the defect marking.

Regarding the device embodiments, due to that they are substantially similar to the process embodiments, they are described simply, and the related parts may refer to the description on the process embodiments.

In the embodiments of the present disclosure, by analyzing the first original image, to determine the image marking approach of the first original image, and, according to the neural network model or the unsupervised algorithm model, performing the defect marking to the first original image, automated defect marking is realized, which increases the speed of the defect marking to the first original image, and saves the labor and the time required by the defect marking.

An embodiment of the present disclosure further provides an image marking system, wherein the system comprises a first client and a server;

the first client comprises the image marking apparatus 900 stated above; and the server is configured for receiving the target marking result sent by the first client or the second client, and storing the target marking result at a designated position.

Optionally, the server is further configured for training according to a plurality of sample images of a same category and a marking result of each of the sample images acquired in advance to obtain a target detection-algorithm model, and according to the target detection-algorithm model, performing defect marking to the first original image in the server, to obtain a first marking result.

In the embodiment of the present disclosure, when the first client is in the first mode, the server receives the target marking result sent by the second client, and when the first client is in the second mode, the server receives the target marking result sent by the first client.

The particular training process of the target detection-algorithm model is performed in the server, and the defect marking to the first original image according to the target detection-algorithm model is also performed in the server.

Optionally, the server is particularly configured for performing feature extraction to the first original image in the server, to obtain a characteristic image; extracting a target candidate region from the characteristic image; performing ROI Pooling processing to the characteristic image corresponding to the target candidate region, to obtain characteristic images of a predetermined size; and classifying the characteristic images of the predetermined size, to obtain the first marking result.

The particular process of the defect marking to the first original image by the server may refer to the description on the step 303, which may not be repeated here further.

In the embodiments of the present disclosure, by analyzing the first original image, to determine the image marking approach of the first original image, and, according to the neural network model or the unsupervised algorithm model, performing the defect marking to the first original image, automated defect marking is realized, which increases the speed of the defect marking to the first original image, and saves the labor and the time required by the defect marking.

Correspondingly, an embodiment of the present disclosure further provides an electronic device, wherein the electronic device comprises a first client, the electronic device comprises a processor, a memory and a computer program that is stored in the memory and is executable in the processor, and the computer program, when executed by the processor, implements the steps of the image marking method stated above.

An embodiment of the present disclosure further provides a computer-readable storage medium, wherein the computer-readable storage medium stores a computer program, and the computer program, when executed by a processor, implements the steps of the image marking method stated above.

Regarding the above-described process embodiments, for brevity of the description, all of them are expressed as the combination of a series of actions, but a person skilled in the art should know that the present disclosure is not limited by the sequences of the actions that are described, because, according to the present disclosure, some of the steps may have other sequences or be performed simultaneously. Secondly, a person skilled in the art should also know that all of the embodiments described in the description are preferable embodiments, and not all of the actions and the modules that they involve are required by the present disclosure.

The above-described device embodiments are merely illustrative, wherein the units that are described as separate components may or may not be physically separate, and the components that are displayed as units may or may not be physical units; in other words, they may be located at the same location, and may also be distributed to a plurality of network units. Some or all of the modules may be selected according to the actual demands to realize the purposes of the solutions of the embodiments. A person skilled in the art may understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the electronic device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 11:
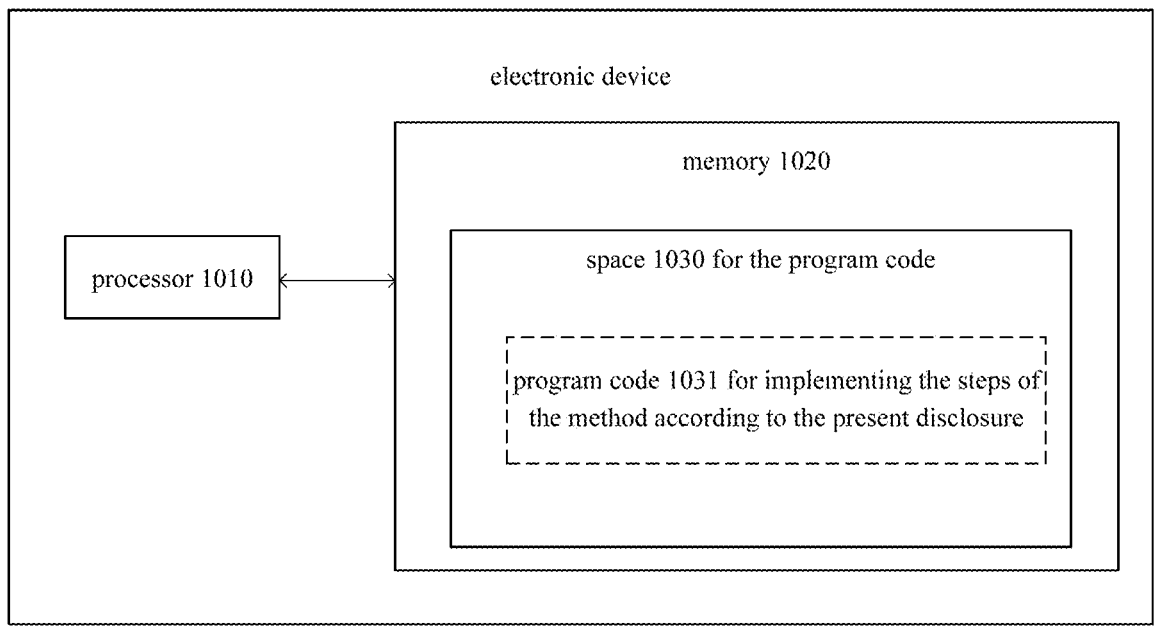
FIG. 11 schematically shows a block diagram of an electronic device for implementing the method according to the present disclosure.
Figure 12:
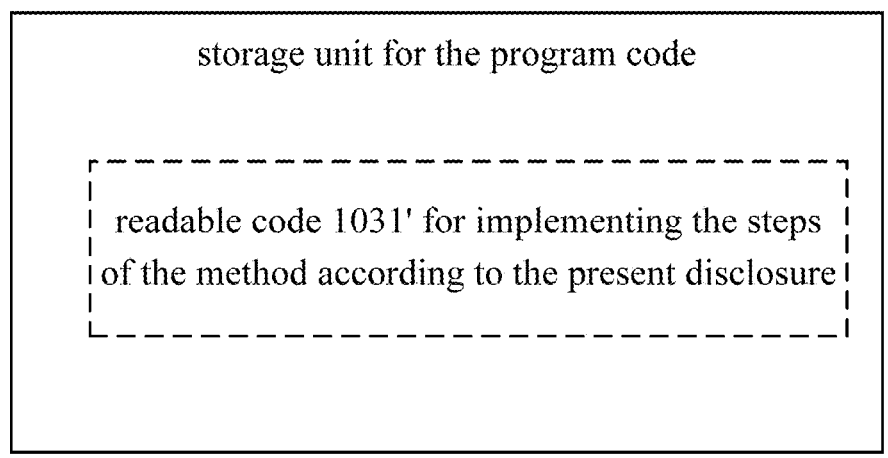
FIG. 12 schematically shows a storage unit for maintaining or carrying a program code for implementing the method according to the present disclosure.

For example, FIG. 11 shows an electronic device that may implement the method according to the present disclosure. The electronic device traditionally comprises a processor 1010 and a computer program product or computer-readable medium in the form of a memory 1020. The memory 1020 may be electronic memories such as flash memory, EEPROM (Electrically Erasable Programmable Read Only Memory). EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 12. The storage unit may have storage segments or storage spaces with similar arrangement to the memory 1020 of the electronic device in FIG. 11. The program codes may, for example, be compressed in a suitable form. Generally, the storage unit contains a computer-readable code 1031', which may be read by a processor like 1010. When those codes are executed by the electronic device, the codes cause the electronic device to implement each of the steps of the method described above.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The image marking method, apparatus and system according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. An image marking method, wherein the method is applied to a first client, and the method comprises:
   determining a working mode of the first client;
   on the condition that the working mode is a first mode, receiving a first marking task assigned by a second client, wherein the first marking task comprises performing defect marking to a first original image, and an image marking approach for performing the defect marking to the first original image comprises a first marking approach, a second marking approach and a third marking approach;

on the condition that the image marking approach is the first marking approach, according to a neural network model, determining a first marking result corresponding to the first original image by using a neural network model;

on the condition that the image marking approach is the second marking approach, according to an unsupervised algorithm model, determining a second marking result corresponding to the first original image;

on the condition that the image marking approach is the third marking approach, receiving a third marking result inputted by a user into the first original image; and sending a target marking result to the second client, wherein the target marking result comprises any one of the first marking result, the second marking result and the third marking result.

2. The method according to claim 1, wherein the step of, on the condition that the image marking approach is the first marking approach, according to the neural network model, determining the first marking result corresponding to the first original image comprises:

on the condition that the image marking approach is the first marking approach, acquiring the first marking result obtained after a server performs defect marking to the first original image in the server through the neural network model selected by the user.

3. The method according to claim 2, wherein the neural network model is a target detection-algorithm model, and the server stores a plurality of categories of target detection-algorithm models; and each of the categories of the target detection-algorithm models is obtained by training according to a plurality of sample images of a same category and a marking result of each of the sample images acquired in advance, wherein a quantity of the sample images is less than a predetermined quantity.

4. The method according to claim 1, wherein the step of, on the condition that the image marking approach is the second marking approach, according to the unsupervised algorithm model, determining the second marking result corresponding to the first original image comprises:

on the condition that the image marking approach is the second marking approach, according to the unsupervised algorithm model, performing defect marking to the first original image in a server, to obtain the second marking result.

5. The method according to claim 1, wherein the unsupervised algorithm model is a fast-Fourier-transform-algorithm model, and the fast-Fourier-transform-algorithm model is stored in the first client.

6. The method according to claim 1, wherein before the step of sending the target marking result to the second client, the method further comprises:

displaying in an image marking interface of the first client the target marking result corresponding to the first original image; and on the condition that an adjusting operation to the target marking result by the user is received, adjusting the target marking result.

7. The method according to claim 6, wherein after the step of, on the condition that the adjusting operation to the target marking result by the user is received, adjusting the target marking result, the method further comprises:

on the condition that an eighth operation to a saving option in the image marking interface by the user is received, saving the target marking result obtained after the adjustment.

8. The method according to claim 6, wherein after the step of displaying in the image marking interface of the first client the target marking result corresponding to the first original image, the method further comprises:

on the condition that a ninth operation to a marking option in the image marking interface by the user is received, marking the target marking result, to obtain a marking result to be processed.

9. The method according to claim 8, wherein the step of sending the target marking result to the second client comprises:

on the condition that a tenth operation to a submitting option in the image marking interface by the user is received, determining whether the marking result to be processed exists in the first original image in the first marking task;

on the condition that the marking result to be processed does not exist, sending the target marking result to the second client; and on the condition that the marking result to be processed exists, displaying a prompt box in the image marking interface, to prompt the user to adjust or save the marking result to be processed.

10. The method according to claim 1, wherein the target marking result comprises a defect category and a defect position of the first original image.

11. The method according to claim 1, wherein after the step of determining the working mode of the first client, the method further comprises:

on the condition that the working mode is a second mode, according to a characteristic of distribution of patterns in a second original image in a server, assigning a second marking task to a third client, wherein the second marking task comprises performing defect marking to the second original image, and an image marking approach for performing the defect marking to the second original image comprises a first marking approach, a second marking approach and a third marking approach; and receiving the target marking result obtained after the third client marks the second original image according to the image marking approach.

12. The method according to claim 11, wherein the step of, according to the characteristic of the distribution of the patterns in the second original image in the server, assigning the second marking task to the third client comprises:

on the condition that the patterns in the second original image are distributed in an array, determining that the image marking approach corresponding to the second original image is the second marking approach;

on the condition that the patterns in the second original image are not distributed in an array and differences between the second original images are small, determining that the image marking approach corresponding to the second original image is the first marking approach; and on the condition that differences between the second original images are large and an image background of the second original image is complicated, determining that the image marking approach corresponding to the second original image is the third marking approach.

13. The method according to claim 11, wherein after the step of receiving the target marking result obtained after the third client marks the second original image according to the image marking approach, the method further comprises:

receiving an examination result with respect to the target marking result inputted by the user into the first client;

on the condition that the examination result has no error, sending the target marking result to the server; and on the condition that the examination result has an error, returning the target marking result to the third client, and re-performing the defect marking.

14. The method according to claim 11, wherein the step of determining the working mode of the first client comprises:

according to a logging-in information of the user on the first client, determining whether the user has an administrator right:

on the condition that the user has the administrator right, determining the working mode of the first client to be the second mode; and on the condition that the user does not have the administrator right, determining the working mode of the first client to be the first mode.

15. The method according to claim 11, wherein the server and the first client or the second client are connected by using a Transmission Control Protocol.

16. An electronic device, wherein the electronic device comprises a first client, the electronic device comprises a processor, a memory and a computer program that is stored in the memory and is executable in the processor, and the computer program, when executed by the processor, implements the steps of the image marking method according to claim 1.

17. An image marking system, wherein the system comprises a first client and a server;

the first client comprises the electronic device according to claim 16; and the server is configured for receiving the target marking result sent by the first client or the second client, and storing the target marking result at a designated position.

18. The system according to claim 17, wherein the server is further configured for:

training according to a plurality of sample images of a same category and a marking result of each of the sample images acquired in advance to obtain a target detection-algorithm model, and according to the target detection-algorithm model, performing defect marking to the first original image in the server, to obtain a first marking result.

19. The system according to claim 18, wherein the server is further configured for:

performing feature extraction to the first original image in the server, to obtain a characteristic image;

extracting a target candidate region from the characteristic image;

performing ROI Pooling processing to the characteristic image corresponding to the target candidate region, to obtain characteristic images of a predetermined size; and classifying the characteristic images of the predetermined size, to obtain the first marking result.

20. A computer-readable storage medium, wherein the computer-readable storage medium stores a computer program, and the computer program, when executed by a processor, implements the steps of the image marking method according to claim 1.

* * * * *